US008050165B2

(12) United States Patent
Nagai et al.

(10) Patent No.: US 8,050,165 B2
(45) Date of Patent: Nov. 1, 2011

(54) OPTICAL INFORMATION RECORDING APPARATUS AND OPTICAL INFORMATION RECORDING METHOD

(75) Inventors: Yutaka Nagai, Yokohama (JP); Koichiro Nishimura, Yokohama (JP); Junya Iizuka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 12/480,335

(22) Filed: Jun. 8, 2009

(65) Prior Publication Data

US 2009/0310463 A1 Dec. 17, 2009

(30) Foreign Application Priority Data

Jun. 12, 2008 (JP) .................................. 2008-153666

(51) Int. Cl.
*G11B 7/0065* (2006.01)
(52) U.S. Cl. ....................................................... 369/103
(58) Field of Classification Search .................. None
See application file for complete search history.

(56) References Cited

U.S. PATENT DOCUMENTS 7,557,971 B1 * 7/2009 Sigel et al. ...................... 359/24

FOREIGN PATENT DOCUMENTS

| JP | 2004-272268 | 9/2004 |
| JP | 2007-256945 | 10/2007 |
| WO | WO 2004/102542 A1 | 11/2004 |

* cited by examiner

*Primary Examiner* — Wayne Young
*Assistant Examiner* — Brian Butcher
(74) *Attorney, Agent, or Firm* — McDermott Will & Emery LLP

(57) ABSTRACT

A need to effectively record data of various sizes on a large-capacity holographic memory capable of high-speed recording is achieved, for example, by curing a first part of the holographic recording which is able to be multiplex-recorded in one or more units of a predetermined volume, and by not recording/curing a second part which is not able to be multiplex-recorded in a predetermined volume at a timing when the first recording part is cured. Also the above need can be achieved by, another example, by adding dummy data to the second part. Alternatively, the second part can be recorded on another track, in which it is possible to record in different units, e.g. by bit recording in a track that utilizes a DVD recording format. According to the present examples, we can record data of various sizes on the holographic memory effectively while performing large-capacity and high-speed holographic recording.

12 Claims, 11 Drawing Sheets

OPTICAL INFORMATION RECORDING APPARATUS AND OPTICAL INFORMATION RECORDING METHOD

BACKGROUND

The present examples relate to an optical information recording apparatus and an optical information recording method.

Optical disc products with a recording density of about 50 GB are being commercialized that are based on Blu-ray Disc (BD) standard and High Definition Digital Versatile Disc (HD DVD) standard using a blue semiconductor laser.

Optical discs are expected to have an increased capacity of as large as 100 GB to 1 TB, comparable to that of HDD (Hard Disk Drive), in the future.

However, to realize such an ultrahigh density with the current optical discs, a novel storage technology is required, different from the conventional trend of high density technologies that attempts to increase the storage capacity by shortening a wavelength and increasing NA of an objective lens.

With wide-ranging studies on next generation storage technologies under way, a hologram recording technology is available that records digital information using holography.

In the holographic technology, data information is recorded through interference patterns of a signal beam modulated two-dimensionally by a spatial light modulator and a reference beam in the holographic storage medium.

Data information is reproduced two-dimensionally by means of CMOS, CCD, or other type of photo detector. These features are effective for large-capacity, high-speed recording and reproduction of information.

Among the hologram recording technologies is one disclosed in JP-A-2004-272268 (Patent document 1). This patent document describes a so-called angle-multiplexed recording method which focuses a signal light flux on an optical information recording medium through a lens and at the same time throws a reference light of collimated rays to the medium to cause interferences to record a hologram and reproduces different pages of data on a spatial optical modulator while changing an incidence angle of the reference light to the optical recording medium to realize multiplexed recording. The patent document also discloses a technology that puts an aperture (spatial filter) at a beam waist of a lens-focused signal light to shorten the intervals of adjoining holograms, thereby increasing the recording density and capacity, compared with those of the conventional angle-multiplexed recording method.

Another hologram recording technology is disclosed in, for example, WO2004-102542 (Patent document 2). This document describes an example of shift multiplexing in a hologram recording method in which one spatial light modulator focuses a light from inner pixels as a signal light and a light from outer ring-like pixels as a reference light onto an optical recording medium through one and the same lens to cause interferences between the signal light and the reference light at near the focus plane of the lens to record a hologram.

Another related art is also found in Japanese Patent Application Laid-open Publication No. 2007-256945-A (Patent document 3). This Patent Document 3 discloses an example of a system to cure a recorded hologram.

In addition, it is known that a "volume" is the actual 3D region on a holographic memory or recording medium, "page" is an interference pattern (2D) recorded at a location within the volume, "page data" is the data to be recorded as 1 page, "book" is an accumulation of pages of data multiplex-recorded on the holographic memory or recording medium, and "a book of data" or "book data" is the data to be recorded as a book on the holographic memory or recording medium.

SUMMARY

Incidentally, for large-capacity and high-speed holographic recording, it is necessary to make a page data size big and to record many pages of data to form a book. The unit of curing on a medium becomes the book unit as the minimum unit, when we consider the discloser of the above documents 1, 2 and 3. In other words, the minimum unit of recording is the book unit, and the minimum region cured is one volume unit. Hence, it is difficult for holographic recoding to record data of various sizes effectively in comparison with bit by bit recording as on a CD, DVD, and Blu-ray Disc. It is not considered how to record data of various sizes by documents 1, 2 and 3. In addition, it is not considered how to add data of various sizes by above documents. Also when there are "odd" data (less data than that for a book) for a volume in which information data is multiplexed-recorded, a problem of wasted memory capacity occurs. This problem may be become an especially big problem when we consider such recording to a write-once medium.

Hence, there is a need to record data of various sizes on a holographic memory effectively while large-capacity and high-speed holographic recording.

The above need can be achieved by, for example, by curing a first part which is able to be multiplex recorded in one or more predetermined volume units, and by not curing a second part which is not able to be multiplex-recorded in a unit of the predetermined volume at a timing when the first part is cured. Also the above need can be achieved in another example by adding dummy data to the second part to enable multiplex recording of an amount of data (the second part and the dummy data) in a unit of the predetermined volume. Another approach records data that does not meet the requirements for a unit of the predetermined volume in a track that utilizes a different recording format, e.g. a track designate for bit by bit recording in a DVD format or the like.

According to the present examples, we can record data of various sizes on the holographic memory effectively while performing large-capacity and high-speed holographic recording.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
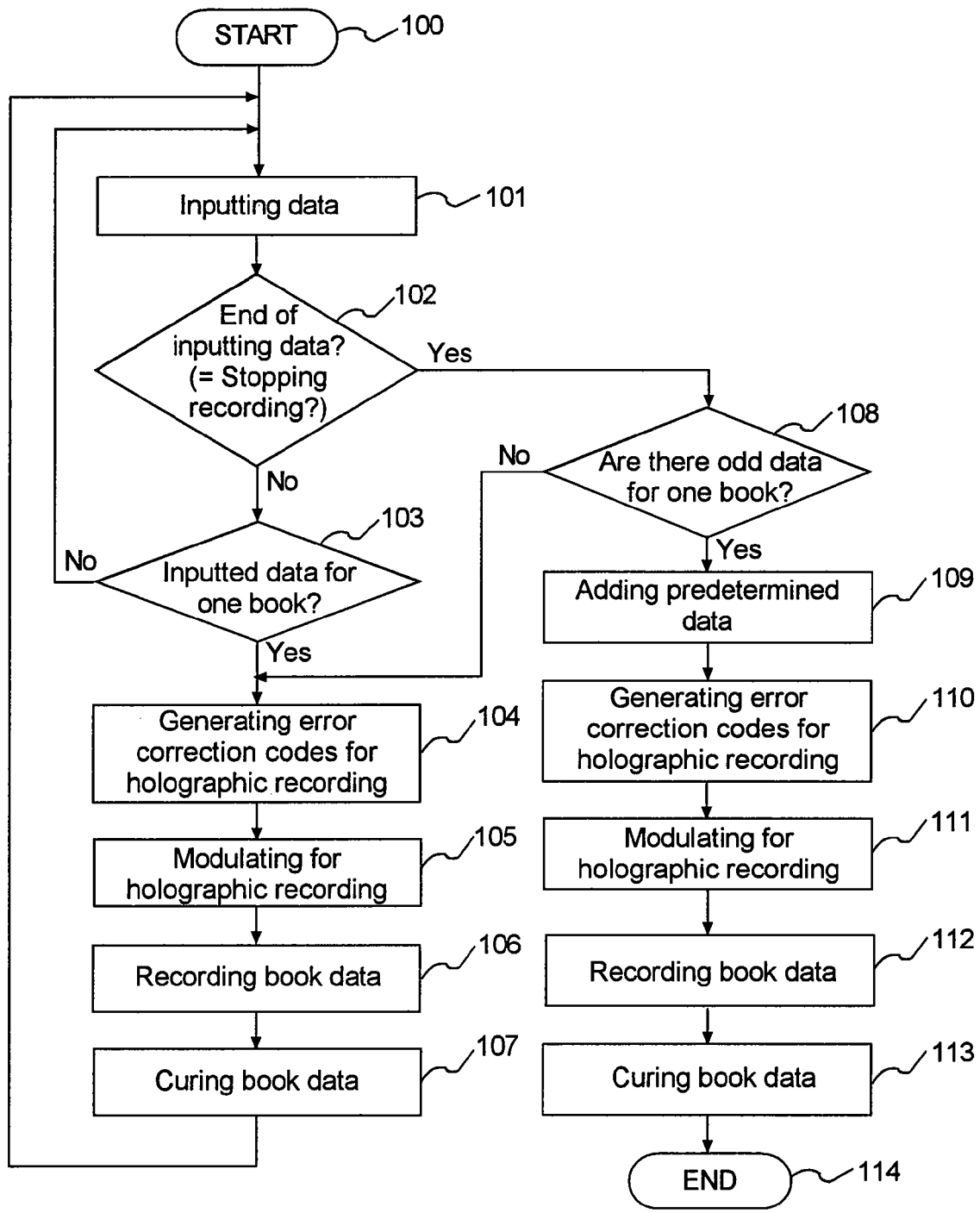
FIG. 1 is a flow chart showing an example of a holographic recording method.

We explain the first example. FIG. 1 shows the flow chart of optical information recording method which records digital information on a holographic memory such as an appropriate optical disk. As showing in FIG. 1, when a recording processing starts (100), recording data are inputted (101). If the input of recording data continues and recording continues (102, No), recording apparatus waits until recording data for one book (one book means a data unit for multiplexed-recorded in the same volume) are inputted (103, No). When recording data for one complete book has been inputted (103, Yes), the error correction codes are generated (104). The recording data are modulated (105), and a two-dimensional modulated page is generated. The recording data is recorded in the holographic memory through interference patterns of the two-dimensional page modulated signal beam with a reference beam. For example, with angular multiplexing recording data for multiple pages is recorded in the same volume forming one book, while changing an angle of the reference beam into the holographic memory for each page of the book (106). When a book unit recording is finished, each book is cured (107). In this way, a book unit (unit of the predetermined volume) is recorded in holographic memory by repeating from step 101 to step 107.

By the way, "odd data" is data of a size less than a book data. After recording data are inputted (102,Yes), if there is no odd data for a book unit (108, No), the book data is recorded in holographic memory by performing from step 104 to 107. If there is odd data for book unit (108, Yes), predetermined dummy data is added to recording data (109), and a combined data for one book is generated. The error correction codes are generated for the combined data (110), and the combined data generated error correction codes is modulated in two-dimensions, and the two-dimensional page data that modulated two-dimensional is generated, and recording data is recorded through interference patterns of the two-dimensional page data as signal beam and reference beam in the holographic memory. For example, with angular multiplexing, recording data is recorded in the same volume for one book changing an angle of the reference beam into the holographic memory (112). When a book unit recording is finished, each book is cured (113), and recoding processing ends. According to this example, we can record and cure the recording data by the book unit regardless of recording data size.

Figure 2:
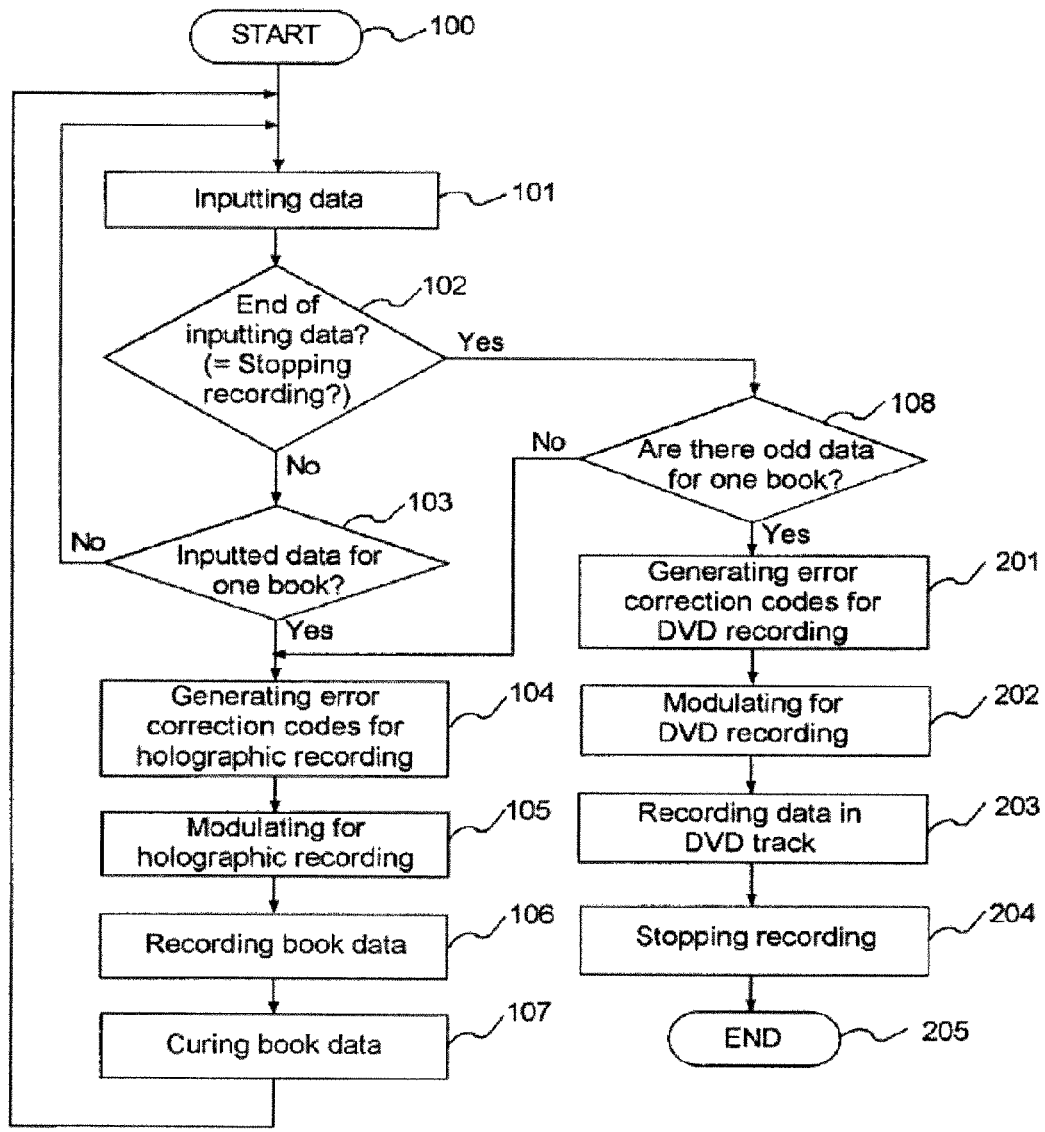
FIG. 2 is a flow chart showing an example of another holographic recording method.
Figure 3:
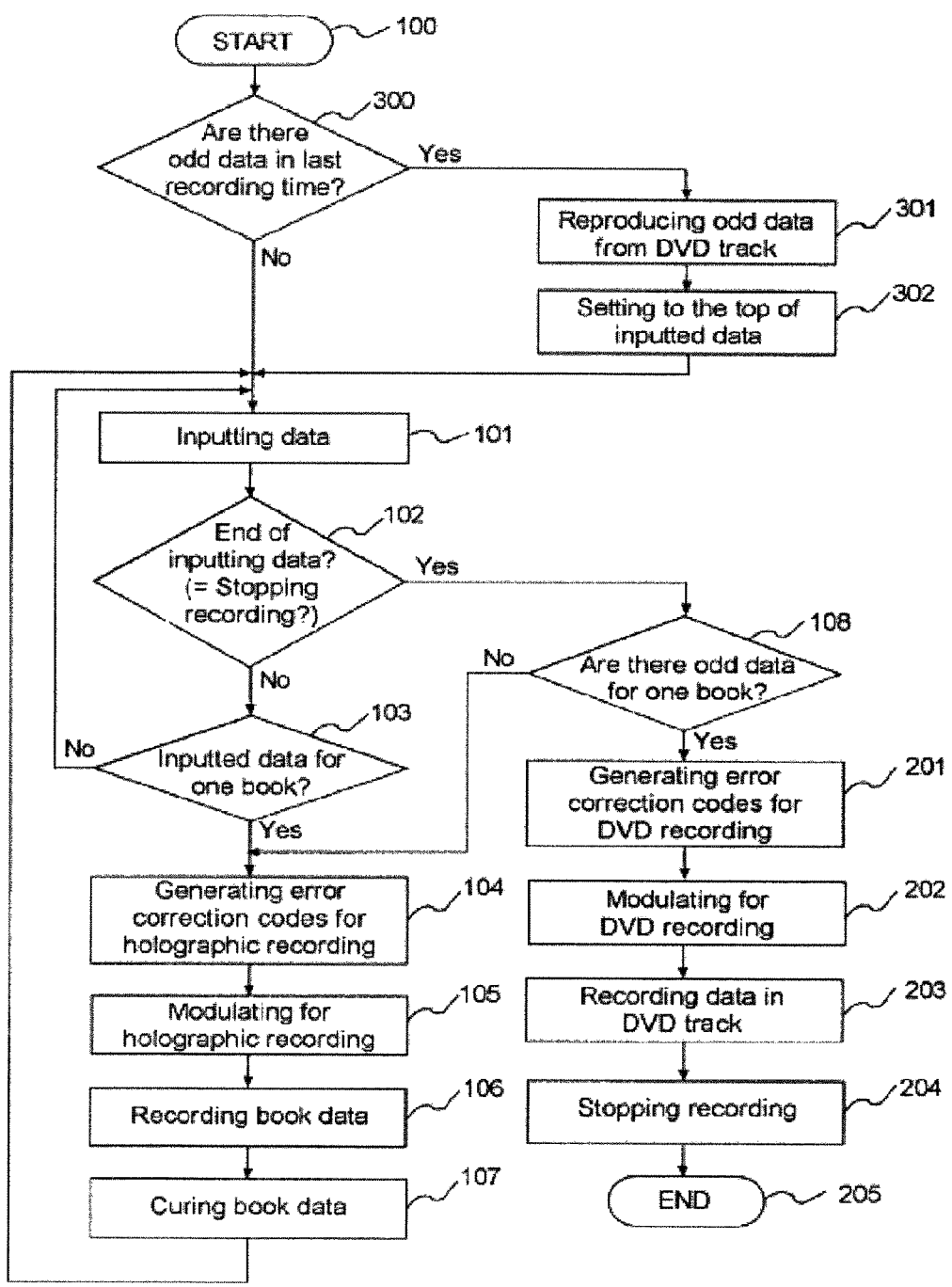
FIG. 3 is a flow chart showing an example of a holographic recording method.
Figure 4:
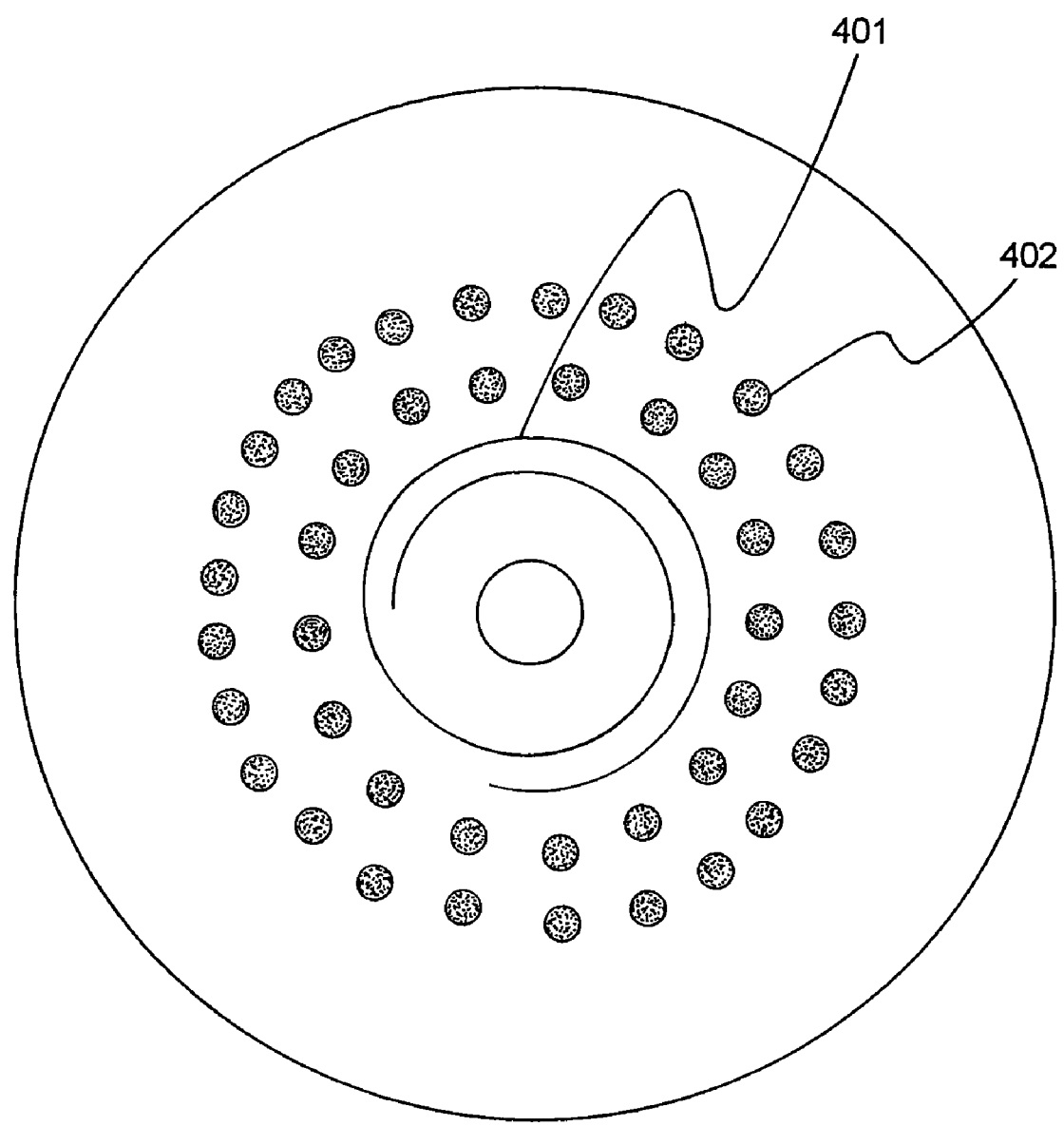
FIG. 4 is a schematic diagram illustrating an example of a holographic memory or recording medium.

We explain the second example next with regard to FIGS. 2 to 4. The second example is assuming recording it to a medium of the constitution shown in FIG. 4. In FIG. 4, 401 is an area arranged in the internal circumference of a disc and is a recording track which can be recorded by the bit by bit recording method (the record track which, for example, obeyed a DVD format). The black dot represented to 402 shows each book of holographic recording. FIG. 2 uses holography to record on the medium as shown in FIG. 4, and it is a flow chart showing an optical information recording method to record digital information on a holographic memory. When a recording processing starts (100), recording data are inputted (101). If the input of the recording data continues and recording continues (102, No), the recording apparatus waits until recording data for one book (a data unit for multiplexed-recorded in the same volume) are inputted (103, No). When recording data for one complete book has been inputted (103, Yes), the error correction codes are generated (104). The recording data are modulated (105), and a two-dimensional modulated page data is generated. The recording data is recorded in holographic memory through patterns of interference between the two-dimensional page data as the signal beam and a reference beam. For example, with angular multiplexing, recording data of multiple pages is recorded in the same volume to form one book, while changing an angle of the reference beam into the holographic memory from page to page (106). When a book unit recording is finished, each book unit is cured (107). In this way, book unit recording is recorded in holographic memory by repeating from step 101 to step 107. After recording data are inputted (102, Yes), if there is no odd data for book unit (108, No), the book data is recorded in holographic memory by performing from step 104 to 107.

In this second example, if there is odd data for book unit (108, Yes), the odd data is recorded in the recording track (401) according to bit by bit recording format. When a recording format is that for DVD, error correction codes according to DVD recording format are generated (201) and the recording data are modulated according to the DVD recording format (202) and recorded in the DVD recording track show in FIG. 4, 401, and the recording processing ends (204) (205). In this way, we can record the odd data by one or more 32K byte units, which is much smaller than a book unit, according to the DVD recording format, and we can record the odd data that does not reach a book without waste of storage capacity on the disk. When recording area of holographic memory is a write once type of medium, we can use recording area effectively. In addition, we can record the odd data that does not reach a book without wastage, even if a DVD recording track is a write once type of medium, because a recording unit of DVD format is much smaller than a book unit.

We will use FIG. 3 to explain processing in which we add data to the medium following the recording method shown in FIG. 2 of the second example. When it starts to add data (100), the recording apparatus judges whether or not there is bit by bit data on the track for odd data recorded during the last previous recording time.

If there is no bit by bit data on the track for odd data recorded during the last previous recording time (300, No), then recording data are inputted and the apparatus starts to process the data through step 102, 103, 104, 105, 107, 108, 201, 202, 203, 204, and 205 the same as in FIG. 2. If there is the bit by bit data already on the track for odd data recorded during the last previous recording time (300, Yes), the bit by bit data on the track for odd data is reproduced (301), and rearranged on the top of inputted data (302). The apparatus then processes the rearranged data through step 102, 103, 104, 105, 107, 108, 201, 202, 203, 204, and 205 the same as in the second example.

In this way, we can record the odd data as a 32K byte unit, which is much smaller than a book unit, according to the DVD recording format when we stop recording. Also we can record the odd data that does not reach a book size without waste of storage capacity on the disk. In addition, we can add the data of various sizes effectively, because the bit by bit data on the track for odd data is reproduced and rearranged on the top of inputted data. Especially, when recording area of holographic memory is a write once type of medium, we can use recording area effectively.

Figure 5:
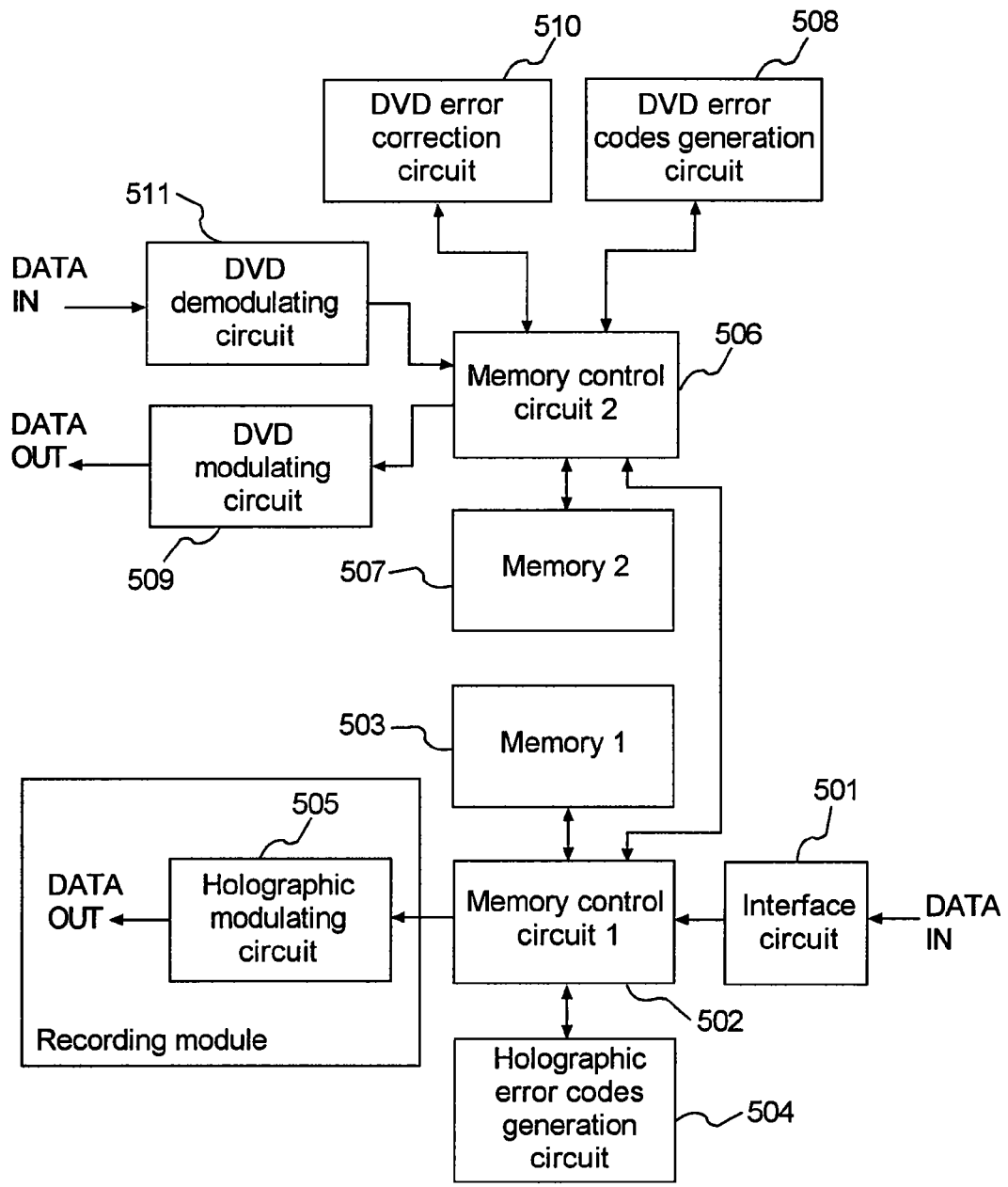
FIG. 5 is a block diagram illustrating an example of a holographic recording apparatus.

We explain the third example with FIG. 5 next. FIG. 5 is block diagram of a recording apparatus for realizing the holographic recording method shown by FIG. 2 and FIG. 3. In FIG. 5, 501 is an input interface circuit that inputs the input data shown in FIG. 2 and FIG. 3. The inputted data from the input interface circuit 501 is stored through memory control circuit 502 in memory 1 (503). Whenever data stored in memory 1 (503) reaches the set size for a book, the error correction codes are generated for the data in a correction code generator 504 (104 of FIG. 2, 3). The data with the generated correction codes are reproduced from memory 1 (503) under control of the memory control circuit. Then the data is modulated in two dimensions by the holographic modulating circuit (105 of FIG. 2, 3), and a two-dimensional modulated page data is generated, and the recording data is recorded through interference patterns of the two-dimensional page data as signal beam and reference beam in holographic memory. For example, with angular multiplexing, the complete book unit is recorded as a number of pages in the same volume by changing an angle of the reference beam into the holographic memory from page to page (106). When these processing steps are handled, the memory control circuit controls the order of data reproducing and handles interleaved process according to holographic recording format.

When data input is finished, and odd data occurred (108, Yes of FIG. 2, 3), the odd data are reproduced from memory 1 (503), and the odd data is stored through memory control circuit 502, 506 in memory 2 (507). After the error correction codes according to DVD recording format are generated for the odd data storing memory 2 (506), the odd data with error correction codes is modulated according to DVD format by DVD modulating circuit 509 (202 of FIG. 2, 3). This modulated data is recorded in DVD recording track, and the recording processing ends once. After then, when data is appended, the recording apparatus judges whether or not there is bit by bit data on the track for odd data recorded during the last previous recording time.

If there is the bit by bit data on the track for odd data recorded during the last previous recording time (300, Yes of FIG. 3), the bit by bit data on the track for odd data is reproduced. The reproduced data are demodulated by the demodulating circuit 511 and are stored through memory control circuit 2 (506) in memory 2 (507) and are processed in error correction circuit (510). The data processed in error correction circuit and stored in memory 2 is stored through memory control circuit 1 (502) and memory control circuit 2 (506) in memory 1. These data are combined with data input newly from interface circuit 501 in memory 1, and whenever the combined data reaches the set size for a book, the generating of correction codes for holographic recording is performed in holographic correction codes generation circuit 504 (104 of FIG. 2, 3). The data with correction codes generated thereto is reproduced through memory control circuit 502 from memory 1 (503), and two-dimensionally modulated (105 of FIG. 2, 3) that obeyed a holographic recording format is generated, and is output as images for page records one by one, and the pages are multiplexed in the same volume (106). In the record apparatus of this example, the adding of data is realized by repetition of the above-mentioned process. In addition, we start the generating of the error correction codes that followed the holographic recording format since data pieces for one book are stored in memory 1 (503) in this example, but it depends on a rule of interleave and error correction codes may be added at an earlier time in the process.

In this example, we can offer a recording apparatus realizing a record method of the holographic by the first and second example as mentioned above. In addition, we do not have to worry exposing an uncured holographic record region to light when we record the odd data on the record track of the bit by bit type DVD format recording. Because we let the laser wavelength for the track of the bit by bit record be different from holographic laser wavelength recording, damage or accidental recording that in the holographic region during bit-by-bit recording is avoided. In this example, we decided to record odd data that does not reach the data capacity of the book of the holographic recording by the record method of the bit by bit. However, we can establish an area that records a small book of the data capacity for an odd data and record data that is lower in size and thus smaller in the page count than the usual book. In this way, we can record the data in angular multiplexing but to the small volume.

Figure 6:
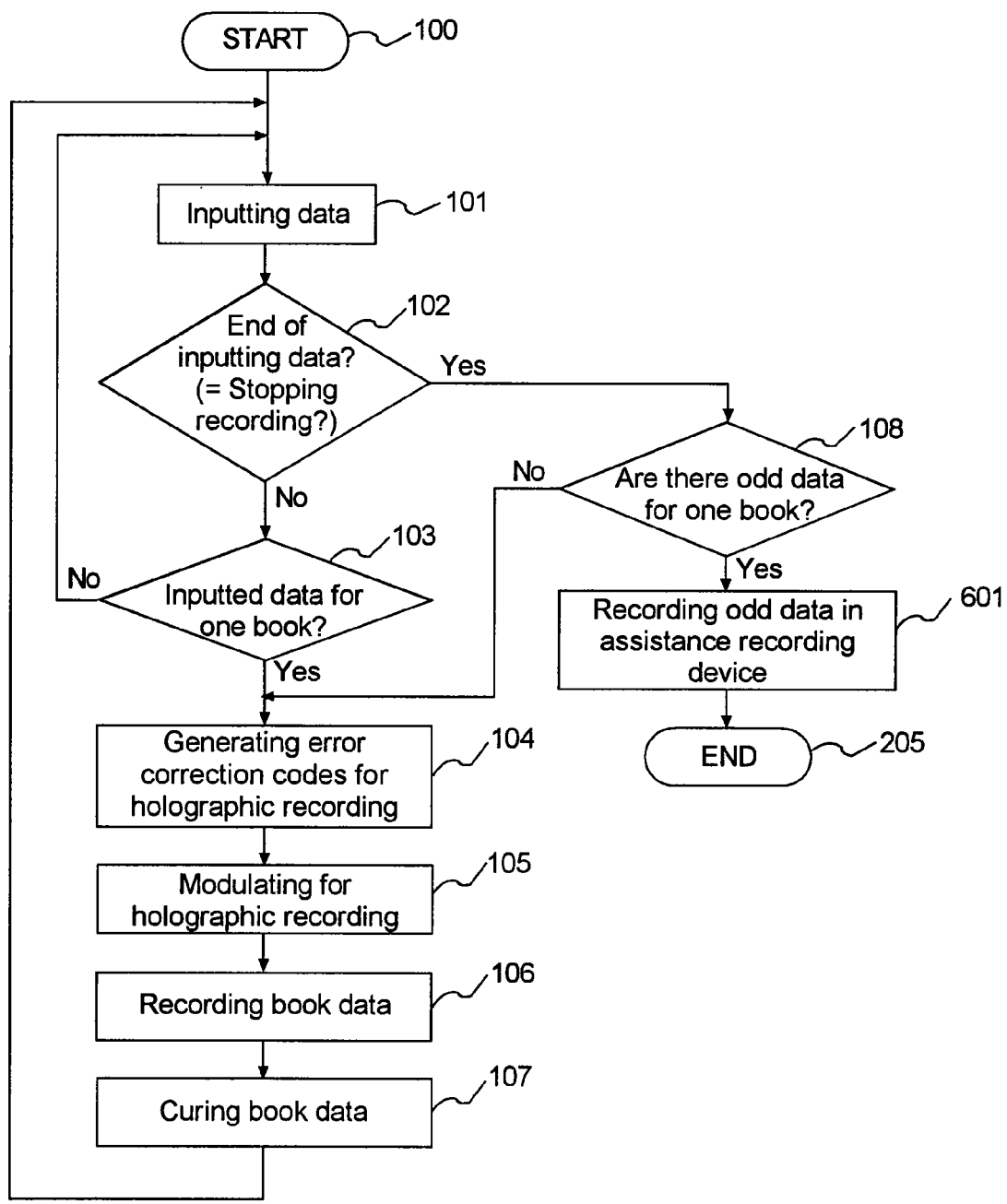
FIG. 6 is a flow chart showing an example of another holographic recording method.
Figure 7:
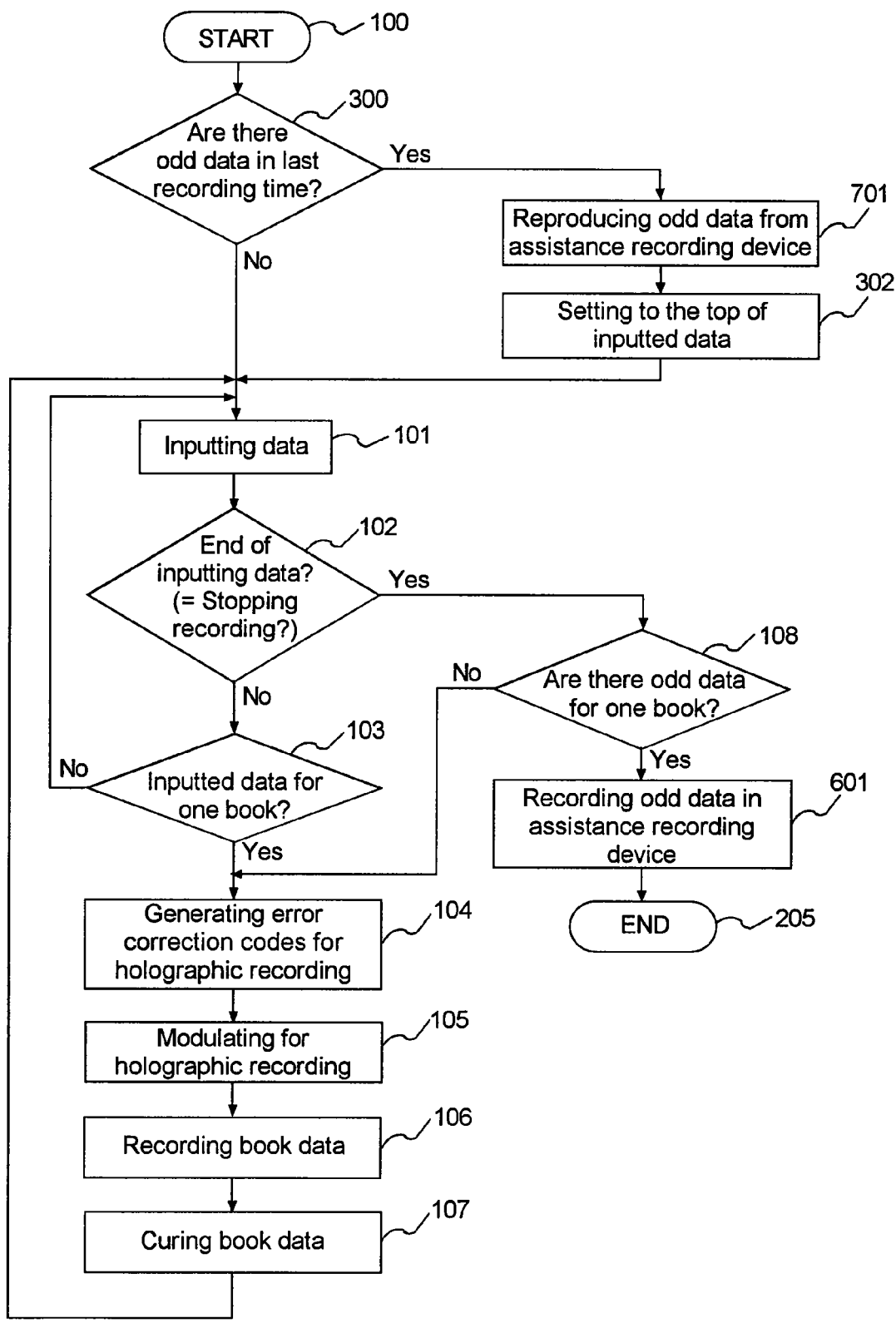
FIG. 7 is a flow chart showing an example of a holographic recording method.

We explain the fourth example with respect to FIG. 6 and FIG. 7 next. FIG. 6 and FIG. 7 are flow charts indicating holographic recording method. This example is characterized in that odd data is recorded in the assistance record region of a record apparatus not in recording medium when an odd data that does not reach a book occurs. We explain the process of the holographic recording with FIG. 6 as follows. If the input of recording data continues and data recording continues (102, No), recording apparatus waits until recording data for one book (a data unit for multiplexed-recorded in the same volume) is inputted (103, No). When recording data for one complete book has been inputted (103, Yes), the correction codes are generated for recording data (104) and the recoding data modulated two-dimensionally (105), and a two-dimensional page data (one or more images) modulated two-dimensionally is generated, and recording data is recorded in holographic memory as interference patterns of the two-dimensional page data as a recording signal beam with the reference beam. For example, with angular multiplexing, book unit is recorded in the same volume for changing an angle of the reference beam into the holographic memory (106). When book unit recording is finished, each book unit is cured (107). In this way, book unit recording is recorded in holographic memory by repeating from step 101 to step 107. After recording data is inputted (102 Yes), if there is no odd data for book unit (108 No), the book data is recorded in holographic memory by performing from step 104 to 107.

If there is odd data for book unit (108, Yes), the odd data is recorded in the assistance record region of a record apparatus (601). We can record the odd data that does not reach a book without waste because we record the odd data in the assistance record region of a crying record apparatus.

We use FIG. 7 and explain processing when we add data to the medium following the recording method shown in FIG. 6 of the fourth example and the assistance record region of a record apparatus has odd data produced at the last recording time of the record end (601, 205). When the apparatus starts to append data, it judges whether or not there is the odd data storing assistance record region of a record apparatus during the last previous recording time. If there is no odd data storing assistance record region of a record apparatus during the last previous recording time (300, No), recording data is inputted and the apparatus starts to process the data through step 102, 103, 104, 105, 107, 108, 601, and 205 the same as in the FIG. 6. If there is the odd data storing assistance record region of a record apparatus during the last previous recording time (300, Yes), the odd data storing assistance record region of a record apparatus is reproduced (701), and rearranged on the top of inputted data (302). The recording apparatus then processes the rearranged data through step 102, 103, 104, 105, 107, 108, 601, and 205 the same as in the FIG. 6, so as to record a book on the holographic memory. In this way, we can record the odd data retrieved from the assistance record region of a record apparatus, and we can record the odd data that does not reach a book without waste of storage capacity on the holographic disk. In addition, if the assistance record device uses a rewritable recording medium, such as an HDD or a semiconductor memory device, the capacity of that device is not a limiting factor.

Figure 8:
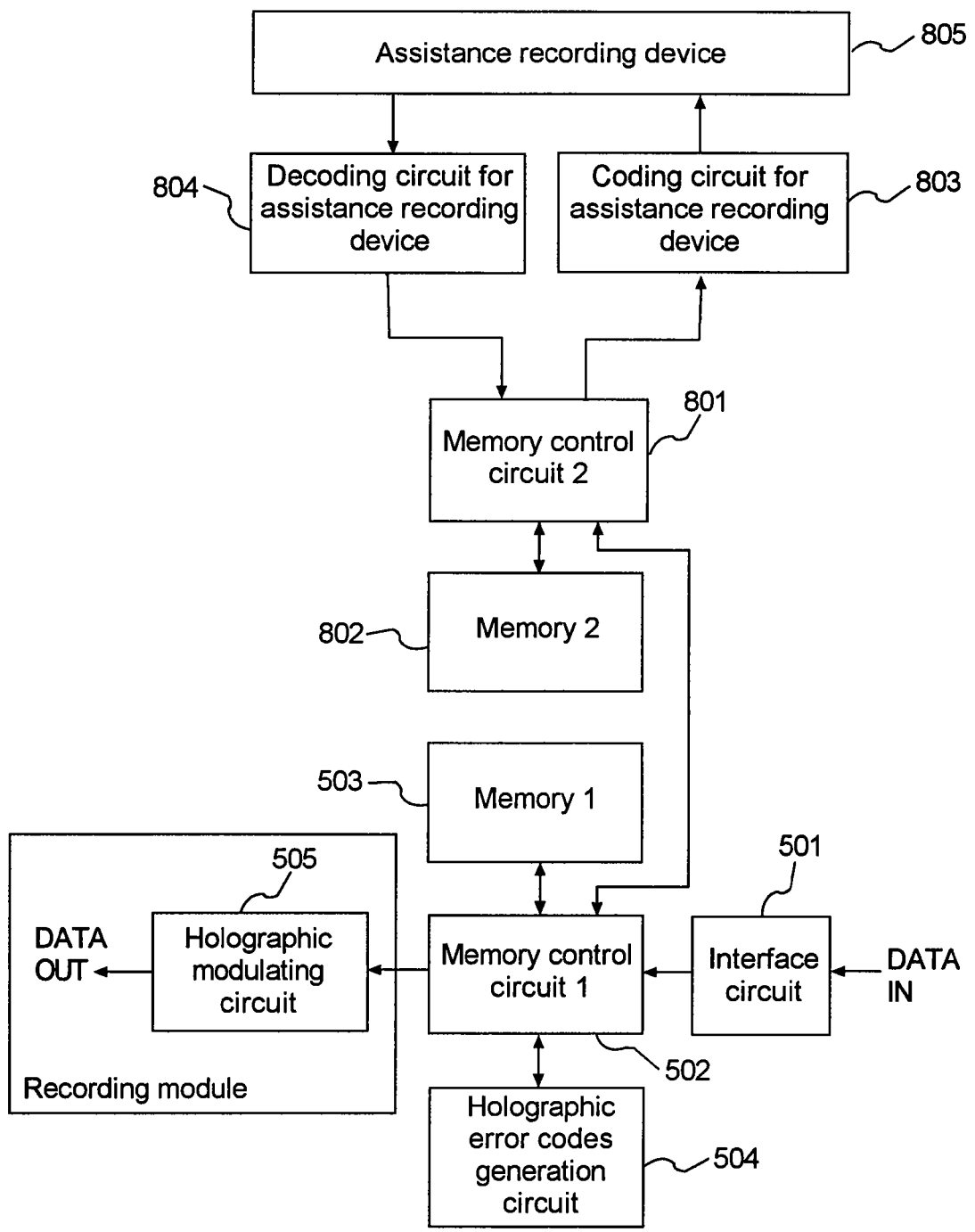
FIG. 8 is a block diagram illustrating another example of a holographic recording apparatus.

We explain the fifth example with FIG. 8 next. FIG. 8 is a block diagram of the recording apparatus to realize the holographic recording method shown in FIG. 6 and FIG. 7. 501 is an input interface circuit in FIG. 8, and it is the part which inputs the input data shown in FIGS. 6 and 7. The inputted data from the input interface circuit 501 is stored through memory control circuit 502 in memory 1 (503). Whenever data stored in memory 1 (503) reaches the set size for a book, the error correction codes are generated for the data in a correction code generator 504 (104 of FIG. 6, 7). The data with generated error correction codes is reproduced from memory 1 (503) under control of the memory control circuit 502. Then the data is modulated in two dimensions by a modulator (105), and two-dimensional page data modulated two-dimensionally is generated. The recording data is recorded as interference patterns formed by interference between the two-dimensional page data as a signal beam and a reference beam in holographic memory (106). For example, with angular multiplexing, a book unit is recorded in the same volume by changing an angle of the reference beam into the holographic memory from page to page (106). When these processing steps are handled, the memory control circuit controls the order of data reproducing and handles interleaved process steps according to holographic recording format.

When data input is finished, and an odd data occurred (108, Yes of FIG. 6, 7), the odd data is reproduced from memory 1 (503), and the odd data is stored through memory control circuit 502, 801 in memory 2 (802). After the encoding is finished to the odd data storing memory 2 (802) in an assistance record region coding circuit 803, and the data with the generated error correction codes is stored in the assistance record region of a record apparatus 805, and the recording processing ends once.

Then when data is appended, the recording apparatus judges whether or not there is the odd data already in the assistance record region of a record apparatus 805 from the last previous recording time. If there is the odd data in the assistance record region of the record apparatus 805 from the last previous recording time (300, Yes of FIG. 7), the odd data in assistance record region of a record apparatus 805 is reproduced. After the reproduced data are decoded by the Decoding circuit for assistance recording device 804, the decoded data are stored through memory control circuit 2 (801) and memory control circuit 1 (502) in memory 1. The data stored in memory 1 are combined to the added data input newly obtained from interface circuit 501 in memory 1, and whenever the combined data reaches the set size for a book, the generating of error correction codes for holographic recording is performed in holographic error correction codes generation circuit 504 (104 of FIG. 7). The data to which correction codes have been added are reproduced through memory control circuit 502 from memory 1 (503), and two-dimensionally modulated data (105 of FIG. 7) that obeyed a holographic recording format is generated as in our earlier examples, and is output as page images for records one by one, and is multiplexed in the same volume as a book (106). In the recording apparatus of this example, the adding of data is realized by repetition of the above-mentioned process. In addition, we start the generating of the error correction codes that followed the holographic recording format since data for one book is accumulated and stored in memory 1 (503) in this example, but it depends on a rule of interleave and may process it in an early timing.

Figure 9:
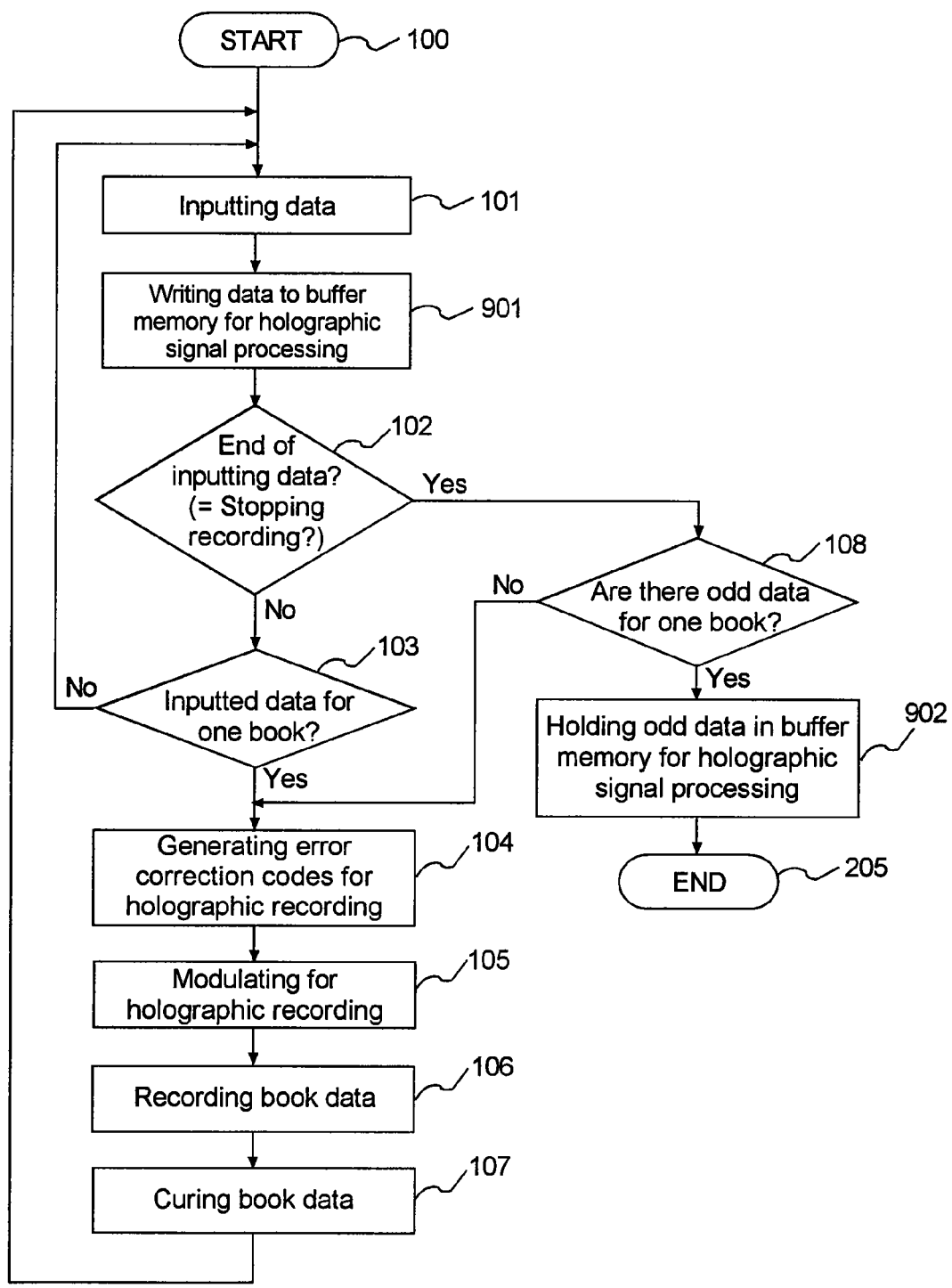
FIG. 9 is a flow chart showing an example of a holographic recording method.

We explain the sixth example with FIG. 9 next. FIG. 9 shows the flow chart of holographic recording method. As shown in FIG. 9, when a recording processing starts (100), recording data is inputted (101). The inputted data is stored in a temporary memory in which the inputted data is coded according to holographic recording format (901). If the input of recording data continues and data recording continues (102, No), the recording apparatus waits until recording data for one book (a data unit for multiplexed-recorded in the same volume) is stored in the temporary memory (103, No). When recording data for one book is stored (103, Yes), the correction codes are added to recording data (104) and modulated two-dimensionally by a spatial light modulator (105), and a two-dimensional page data which modulated two-dimensionally by the spatial light modulator is generated, and recording data is recorded through interference patterns of the two-dimensional page data as signal beam and reference beam in holographic memory. For example, with angular multiplexing, a book unit of multiple pages is multiplex recorded in the same volume by changing an angle of the reference beam into the holographic memory from page to page of the book (106). When book unit recording is finished, each book unit is cured (107).

In this way, book unit recording is recorded in holographic memory by repeating from step 101 to step 107.

After recording data is inputted (102, Yes), if there is no odd data for book unit (108, No), the book data is recorded in holographic memory by performing from step 104 to 107. If there is odd data for book unit (108, Yes), the odd data is stored in a temporary memory in which the inputted data is coded according to holographic recording format (901), and this stored odd data is held. In this way, we can record the odd data in the temporary memory, and we can record the odd data that does not reach a book without waste of storage capacity on the disk. Especially, when the holographic memory is a type of write-once, we can record the odd data that does not reach a book without waste of storage capacity on the disk.

We use FIG. 9 and explain processing when we add data to the medium following the recording method to show in FIG. 9 of the sixth example. When it starts to add data (100), the recording apparatus judges whether or not there is the odd data storing the temporary memory during the last previous recording time. If there is the odd data storing the temporary memory during the last previous recording time (300Yes), the odd data storing in the temporary memory is combined with inputted data for adding data 101, and then steps 102, 103, 104, 105, 107, 108, 902, and 205 continue as well. In this way, we can record the odd data in the temporary memory, and we can record the odd data that does not reach a book without waste of storage capacity on the disk. Especially, when the holographic memory is a type of write-once, we can record the odd data that does not reach a book without waste of storage capacity on the disk. In addition, this example can be realized easily when we use non-volatile RAM such as MRAM (magnetoresistive RAM), PRAM (phase change RAM), ReRAM (resistive RAM).

Figure 10:
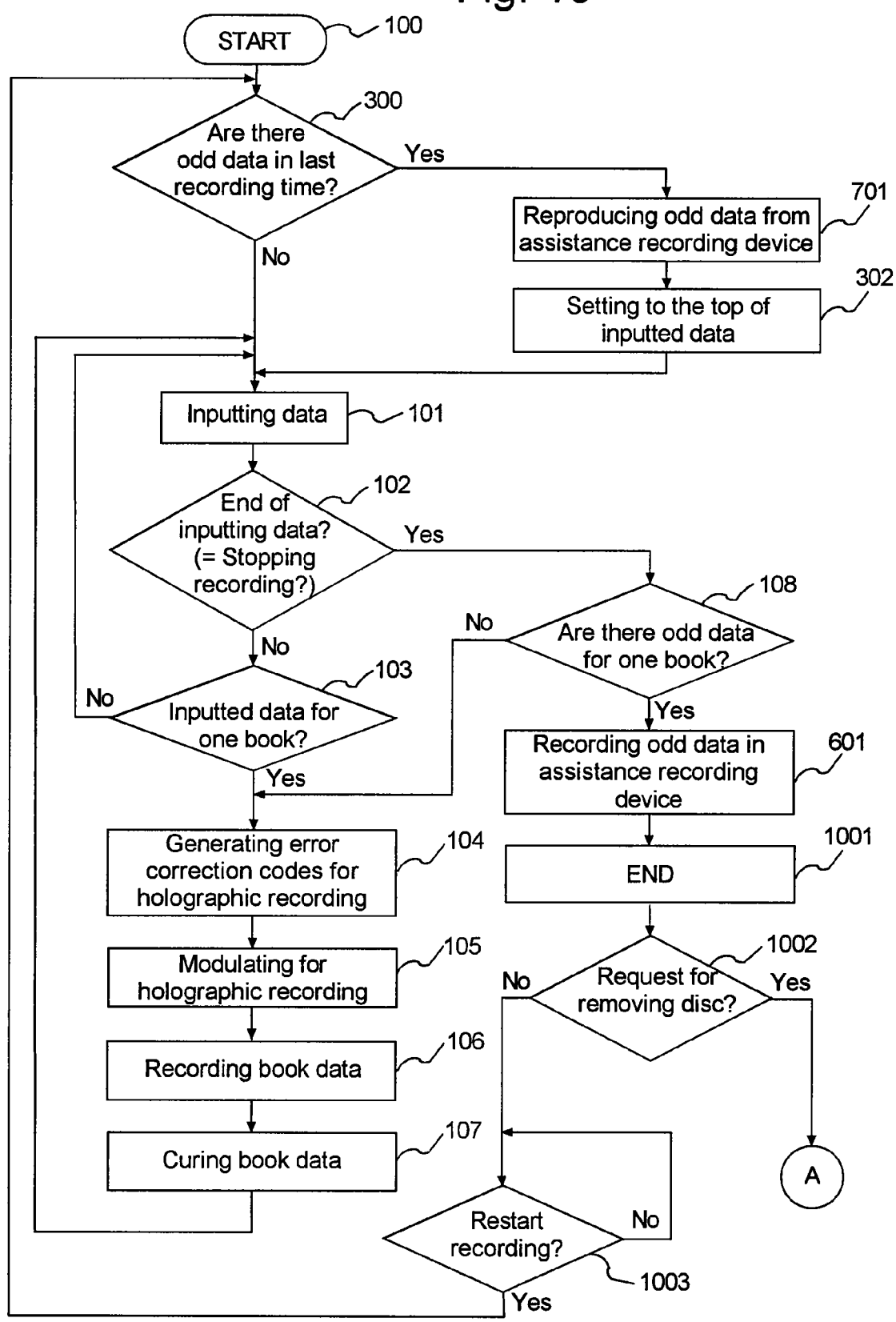
FIG. 10 is a flow chart showing an example of a holographic recording method.
Figure 11:
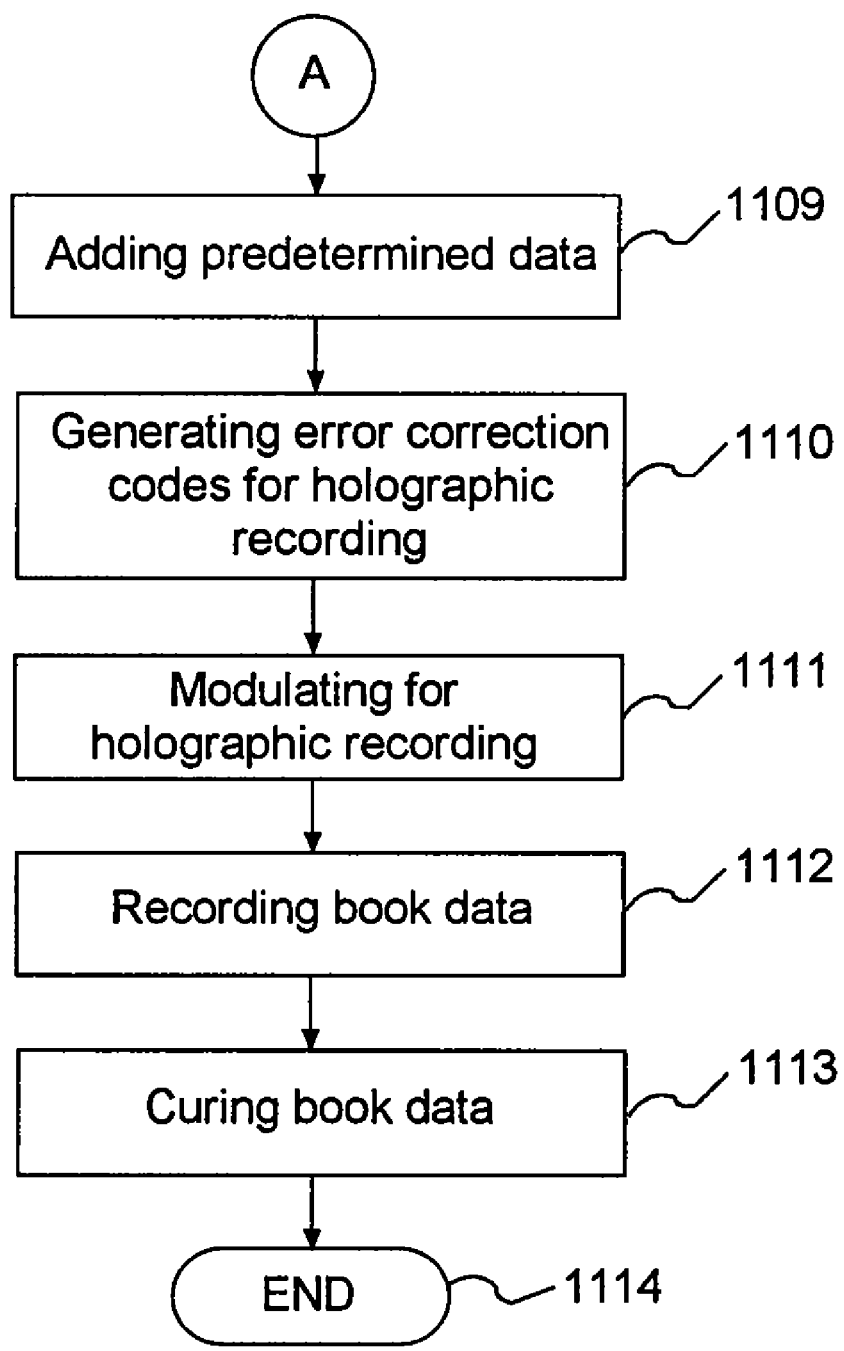
FIG. 11 is a flow chart showing an example of a holographic recording method.

We explain the seventh example with reference to FIG. 10 and FIG. 11 next. FIG. 10 and FIG. 11 are the flow charts showing the method of holographic recording. This example is characterized in that an odd data is recorded in the assistance record region of a recording apparatus not in recording medium when an odd data that does not reach a book occurs. In addition, we let you realize how you processed it, when the disc is removed from the recording apparatus before finishing writing all the disc. The discussion of the adding data process of the holographic recording gives a different explanation about processing in comparison with FIG. 7 and FIG. 10 in order as follows. When the apparatus starts to add data, it judges whether or not there is the odd data storing assistance record region of a record apparatus during the last previous recording time. If there is no odd data storing assistance record region of a recording apparatus during the last previous recording time (300 No), recording data is inputted and the recording apparatus starts to process the data through step 102, 103, 104, 105, 107, 108, 601, 1001 the same as in the FIG. 7. When there is a request to remove the disc after stopping recording the data, a terminal process starts. When the terminal process starts, predetermined data is added to the odd data storing assistance record region of a record apparatus for a book (1109), and the correction codes are added to the combined data for a book (1110). The added data is modulated two-dimensionally by a spatial light modulator (1111), and the two-dimensional page data which modulated two-dimensionally by the spatial light modulator is generated as a signal beam, and these data are recorded through interference patterns of the two-dimensional page data signal beam and the reference beam in the holographic memory. For example, with angular multiplexing, a book unit is recorded in the same volume by changing an angle of the reference beam into the holographic memory for the different pages of the book (1112). When book unit recording is finished, each book unit is cured (1113). In this way, the data is recorded and cured for every book unit. If there is no request to remove the disc after stopping recording the data (1002 No), the apparatus goes back to the processing 101 after demanding recording. On the other hand, if there is the odd data storing assistance record region of a record apparatus during the last previous recording time (300 Yes), the odd data stored in the assistance record region of a record apparatus is reproduced (701), and the data thus reproduced is rearranged on the top of newly inputted data (302). The apparatus then processes the rearranged data through step 102, 103, 104, 105, 107, 108, 601, 1001, 1002, 1004, 1109-1114 the same as in the FIG. 7.

In this way, we can record the odd data recovered from the assistance record region of a recording apparatus, and we can record the odd data that does not reach a book without waste of storage capacity on the disk. In addition, if the assistance record region or device uses a rewritable recording medium, such as an HDD or a semiconductor memory device, the capacity of that device is not a limiting factor. When there is a request to remove the disc and there is the odd data in the assistance record region of a record apparatus, the predetermined data are added, and curing is performed by a book unit surely. Hence, we can remove the disc safely.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A recording apparatus which records data on a holographic memory comprising:
an interface circuit which inputs data;
a modulating circuit which modulates the data inputted through the interface circuit onto a light beam; and
a recording module which multiplex records data, using the modulated light beam from the modulating circuit, on a holographic memory in units of a predetermined volume;
wherein the recording apparatus can load a disc which has a holographic memory area and a bit-by-bit recording track, and
wherein a first part of the data which is able to be multiplex recorded every predetermined volume is recorded on the holographic memory and is cured, a second part of the data which is not able to be multiplex recorded every predetermined volume is not cured at a timing when the first part is cured, and the second part of the data is recorded on the bit-by-bit recording track at a timing when the first part is cured.

2. A recording apparatus according to claim 1, wherein when new data is inputted through the interface circuit after the timing when the first part is cured, the second part of the data recorded on the bit-by-bit recording track is retrieved from the bit-by-bit recording track, and the recording module multiplex records the second part of the data retrieved from the bit-by-bit recording track in combination with the new data on the holographic memory in one or more units of the predetermined volume, and the recording of the second part of the data and the new data is cured.

3. A recording apparatus which records data on a holographic memory comprising:
an interface circuit which inputs data;
a modulating circuit which modulates the data inputted through the interface circuit onto a light beam;
a recording module which multiplex records data, using the modulated light beam from the modulating circuit, on a holographic memory in units of a predetermined volume; and
an assistance recording device which stores data;
wherein:
a first part of the data which is able to be multiplex recorded every predetermined volume is recorded on the holographic memory and is cured,
a second part of the data which is not able to be multiplex recorded every predetermined volume is not cured at a timing when the first part is cured, and
the second part of the data is stored in the assistance recording device when not cured at the timing when the first part is cured, and then the recording operation ends.

4. A recording apparatus according to claim 3, wherein when new data is inputted through the interface circuit after the end of the recording operation, the recording module multiplex records the second part of the data stored in the assistance recording device and the new data on a holographic memory in one or more units of the predetermined volume, and the recording of the second part of the data from the assistance recording device and the new data is cured.

5. A recording apparatus which records data on a holographic memory comprising:
an interface circuit which inputs the data;
a modulating circuit which modulates the data inputted through the interface circuit onto a light beam; and
a recording module which multiplex records the data, using the modulated light beam from the modulating circuit, on a holographic memory every predetermined volume;
wherein a first part of the data which is able to be multiplex recorded in units of a predetermined volume is cured,
wherein dummy data is added to a second part of the data which is not otherwise able to be multiplex recorded in units of the predetermined volume to form data for recording in a unit of the predetermined volume, and the recording of data to which had been added the dummy data is cured.

6. A recording method for recording data using holography on a recording medium having a holographic memory area and a bit-by-bit recording track, comprising the steps of:
receiving input data;
modulating the inputted data on a light beam; and
using the modulated light beam, multiplex recording data to the holographic memory area in units of a predetermined volume;
wherein a first part of the data which is able to be multiplex recorded in units of the predetermined volume is recorded on the holographic memory area and is cured,
a second part of the data which is not able to be multiplex recorded in a unit of the predetermined volume is not cured at a timing when the first part is cured, and the second part of the data is recorded on the bit-by-bit recording track at a timing when the first part is cured.

7. A recording method according to claim 6, wherein when new data is inputted after the timing when the first part is cured, further comprising the steps of:
retrieving the second part of the data that is recorded on the bit-by-bit recording track from the bit-by-bit recording track;
multiplex recording the second part of the data retrieved from the bit-by-bit recording track in combination with the new data to the holographic memory area in one or more units of the predetermined volume; and
curing the recording of the second part of the data and the new data.

8. A recording method for recording data using holography via a recording apparatus having an assistance recording device which stores data, the method comprising the steps of:
receiving input of data;
modulating the inputted data on a light beam; and
using the modulated light beam, multiplex recording data to a holographic memory in units of a predetermined volume, wherein:
a first part of the data which is able to be multiplex recorded in units of predetermined volume is recorded on a holographic memory and is cured,
a second part of the data which is not able to be multiplex recorded in a unit of the predetermined volume is not cured at a timing when the first part is cured, and
the second part of the data is stored in the assistance recording device when not cured at the timing when the first part is cured, and then the recording operation ends.

9. A recording method according to claim 8, wherein when new data is inputted through the interface circuit after the end of the recording operation, the method further comprises the steps of:
multiplex recording the second part of the data stored in the assistance recording device and the new data on a holographic memory in one or more units of the predetermined volume; and
curing the recording of the second part of the data from the assistance recording device and the new data.

10. A recording method for recording data on a holographic memory comprising the steps of:
receiving input data;
modulating the inputted data on a light beam; and
using the modulated light beam, multiplex recording data to the holographic memory in units of a predetermined volume;
wherein a first part of the data which is able to be multiplex recorded in units of a predetermined volume is cured,
wherein dummy data is added to a second part of the data which is not otherwise able to be multiplex recorded in units of the predetermined volume to form data for recording in a unit of the predetermined volume, and the recording of data to which had been added the dummy data is cured.

11. A recording apparatus according to claim 3, wherein when a request to remove the holographic memory from the recording apparatus is received, dummy data is added to the second part of the data stored in the assistance recording device to form data for recording in a unit of the predetermined volume, and the recording of the second data to which had been added the dummy data is cured.

12. A recording method according to claim 8, wherein when a request to remove the holographic memory from the recording apparatus is received, dummy data is added to the second part of the data stored in the assistance recording device to form data for recording in a unit of the predetermined volume, and the recording of the second data to which had been added the dummy data is cured.

* * * * *